United States Patent
Knitl et al.

(10) Patent No.: US 10,538,936 B2
(45) Date of Patent: Jan. 21, 2020

(54) WIND TURBINE TOWER MADE OF PREFABRICATED CONCRETE PARTS IN THE SHAPE OF ANNULAR SEGMENTS

(71) Applicant: MAX BÖGL WIND AG, Sengenthal (DE)

(72) Inventors: Josef Knitl, Freystadt (DE); Stefan Bögl, Sengenthal (DE)

(73) Assignee: MAX BÖGL WIND AG, Sengenthal (DE)

( * ) Notice: Subject to any disclaimer, the term of this patent is extended or adjusted under 35 U.S.C. 154(b) by 0 days.

(21) Appl. No.: 15/760,340

(22) PCT Filed: Aug. 30, 2016

(86) PCT No.: PCT/EP2016/070353
§ 371 (c)(1),
(2) Date: Mar. 15, 2018

(87) PCT Pub. No.: WO2017/045907
PCT Pub. Date: Mar. 23, 2017

(65) Prior Publication Data
US 2018/0251997 A1    Sep. 6, 2018

(30) Foreign Application Priority Data

Sep. 15, 2015 (DE) .................. 10 2015 115 520
Aug. 12, 2016 (DE) .................. 10 2016 115 042

(51) Int. Cl.
*E04H 12/34* (2006.01)
*E04H 12/12* (2006.01)
(Continued)

(52) U.S. Cl.
CPC ........... *E04H 12/342* (2013.01); *E04H 12/12* (2013.01); *E04H 12/16* (2013.01); *F03D 13/20* (2016.05)

(58) Field of Classification Search
CPC ....... E04H 12/342; E04H 12/12; E04H 12/16; F03D 13/20; Y02E 10/728
See application file for complete search history.

(56) References Cited

U.S. PATENT DOCUMENTS 7,770,343 B2 *  8/2010  Montaner Fraguet ......................
                                                     E04H 12/12
                                                        52/223.5
7,877,944 B2    2/2011  Seidel
(Continued)

FOREIGN PATENT DOCUMENTS

CN          1788156 A     6/2006
CN        102011709 A     4/2011
(Continued)

OTHER PUBLICATIONS

English Translation of International Preliminary Report on Patentability with Written Opinion for Application No. PCT/EP2016/070353, dated Mar. 20, 2018.
(Continued)

*Primary Examiner* — Adriana Figueroa
(74) *Attorney, Agent, or Firm* — JK Intellectual Property Law, PA

(57) ABSTRACT

A tower for a wind turbine includes at least one tower section made of concrete, made up of several annular concrete segments arranged on top of one another with horizontal joints. Each concrete segment includes at least two annular segment prefabricated concrete parts arranged in parallel with vertical joints. The each have one outer side, one inner side and one upper, lower and two lateral contact faces. The concrete segments are connected to one another in the vertical direction by vertical clamping devices.

19 Claims, 8 Drawing Sheets

(51) Int. Cl.
 *E04H 12/16* (2006.01)
 *F03D 13/20* (2016.01)

(56) References Cited

U.S. PATENT DOCUMENTS

| | | | | |
|---|---|---|---|---|
| 7,980,814 | B2 * | 7/2011 | Nieuwenhuizen | E04H 12/085 415/119 |
| 8,256,174 | B2 * | 9/2012 | Irniger | E04H 12/12 52/223.3 |
| 8,511,013 | B2 | 8/2013 | Voss | |
| 8,511,044 | B2 * | 8/2013 | Puigcorbe Punzano | E04H 12/08 52/40 |
| 8,844,237 | B2 * | 9/2014 | Kapitza | E04H 12/12 52/651.01 |
| 9,091,095 | B2 * | 7/2015 | Bogl | E04H 12/08 |
| 9,163,613 | B2 * | 10/2015 | Martinez de Castaneda | E04H 12/085 |
| 9,243,418 | B2 * | 1/2016 | Bogl | E04H 12/08 |
| 9,624,687 | B2 * | 4/2017 | Aranzadi De Miguel | E04H 12/12 |
| 2010/0281818 | A1 * | 11/2010 | Southworth | E02D 27/42 52/745.17 |
| 2013/0081350 | A1 | 4/2013 | Bögl et al. | |

FOREIGN PATENT DOCUMENTS

| | | | | |
|---|---|---|---|---|
| DE | 10 2010 005991 | | 7/2011 | |
| DE | 10 2013 108692 | | 2/2015 | |
| DE | 102013108692 | A1 * | 2/2015 | ............ E04H 12/20 |
| EP | 1 262 614 | A2 | 12/2002 | |
| EP | 2 253 782 | B1 | 11/2010 | |
| EP | 2 631 393 | | 8/2013 | |
| EP | 2672115 | A2 * | 12/2013 | ............ E04H 12/085 |
| EP | 2781673 | A1 * | 9/2014 | ............ E04H 12/16 |
| GB | 1 105 133 | A | 3/1968 | |
| JP | 2005-180082 | A | 7/2005 | |
| KR | 10-2012-0077650 | A | 7/2012 | |
| WO | WO 2010/006659 | | 1/2010 | |
| WO | WO-2010006659 | A1 * | 1/2010 | ............ E04H 5/125 |
| WO | WO 2011/015659 | | 12/2011 | |
| WO | WO 2015/049362 | A1 | 4/2015 | |
| WO | WO 2017/039922 | | 3/2017 | |
| WO | WO-2017039922 | A1 * | 3/2017 | ............ E04H 12/12 |

OTHER PUBLICATIONS

German Search Report for 10 2016 115 042.8 dated May 24, 2017.
Chinese Application No. 2016800532566 Office Action dated Jul. 3, 2019 with English Translation.

* cited by examiner

WIND TURBINE TOWER MADE OF PREFABRICATED CONCRETE PARTS IN THE SHAPE OF ANNULAR SEGMENTS

CROSS-REFERENCE TO RELATED APPLICATIONS

This application is a national stage of International Application No. PCT/EP2016/070353, filed Aug. 30, 2016, and claims benefit to German Patent Application No. 10 2015 115 520.6 filed Sep. 15, 2015, and DE 10 2016 115 042.8, filed Aug. 12, 2016, all of which are incorporated by reference herein.

TECHNICAL FIELD

The present invention refers to a tower for a wind turbine with at least one tower section made of concrete, made up of several annular concrete segments arranged on top of one another through the formation of horizontal joints. In this case, each concrete segment consists of at least two annular segment prefabricated concrete parts arranged in parallel by forming vertical joints. The annular segment prefabricated concrete parts have in each case one outer side, one inner side and one upper, lower and two lateral contact faces. The concrete segments of the at least one tower section are connected to one another in the vertical direction by vertical clamping devices.

BACKGROUND

In the state of the art, towers for wind turbines are known to have highly varied designs. In addition to towers erected by means of identical formworks in in-situ concrete, steel towers and pre-stressed towers made of prefabricated concrete parts have also become known. When the wind turbine is operating, the towers are subject to significant stresses caused by wind speeds and the impulses of the turning rotor. Therefore, the construction of towers must also have sufficient stiffness for cases of extreme load.

EP 1 474 579 B1 shows a tower made up of annular tower sections, each one consisting of several prefabricated concrete parts. The annular tower sections are clamped together by clamping devices in the vertical direction of the tower. To assemble the tower, the individual prefabricated concrete parts are assembled to form an annular section on the construction site, whereas the vertical joints between two adjacent prefabricated concrete parts are filled with mortar. Likewise, the horizontal joints between two such sections are filled with mortar. As a result of this, a tower stiffness is attained in horizontal and vertical direction. However, the on-site assembly of the tower is relatively complex and time consuming. In addition, the individual prefabricated concrete parts of the tower are relatively large, which makes transportation to the construction site and handling of the structural parts on the site more difficult.

EP 2 631 393 A1 also shows a wind turbine tower that consists of large annular segment prefabricated concrete parts clamped together in the vertical direction by clamping devices. According to one of the embodiments described therein, the individual annular segment prefabricated concrete parts can be joined in horizontal direction even without mortar or the vertical joints executed dry. In order to attain the tower's necessary stiffness during its operation, the annular segment prefabricated concrete parts must be clamped together in horizontal direction with screws or bolts. To do this, the installation parts of the prefabricated concrete parts must have the corresponding boreholes for the bolts or screws and be screwed together on the construction site.

SUMMARY

The task of the present disclosure is to suggest a tower made of prefabricated concrete parts with sufficient stiffness that can be easily assembled on the construction site.

The task is solved with the characteristics of the disclosed subject matter.

For example, a tower for a wind turbine has at least one tower section made of concrete made up of several superimposed annular concrete segments by forming horizontal joints. In this case, each concrete segment is made up of at least two annular segment prefabricated concrete parts arranged in parallel by forming vertical joints. The prefabricated concrete parts have in each case one outer side, one inner side, one upper, one lower and two lateral contact faces. Here, the concrete segments of the at least one tower section are joined together in vertical direction of the tower only by vertical clamping devices.

It is now intended for the vertical joints of two superimposed concrete segments to be arranged in each case offset to one another in the circumferential direction of the concrete segments, whereas in each case one prefabricated concrete part of an upper concrete segment of the two superimposed concrete segments overlaps one vertical joint of a concrete segment lying underneath of the two concrete segments arranged on top of one another. In this case, the concrete segments arranged on top of one another are clamped together in such a way by the vertical clamping devices, especially vertical tendons, that a load-distributing friction connection is formed by the prefabricated concrete part overlapping the vertical joint in the horizontal direction of the tower. Thus, through the friction connection, the vertical joint of the concrete segment lying underneath is bridged without the use of mortar or screws in such a way that good stiffness is also attained in horizontal direction or a better load-bearing capacity under bending stress is ensured. In order to do this, the pre-tensioning forces of the vertical clamping devices must be so high that the friction forces forming in the horizontal joints can safely fix the individual prefabricated concrete parts of a segment in place in an extreme load situation as well and prevent an opening of the vertical joints. Since the casting step of the vertical joints can be dispensed with on the construction site and it is not necessary to wait for the mortar to set between the joints, the tower can be built very quickly and economically.

When doing this, it is especially advantageous if the prefabricated concrete parts of one concrete segment are joined together only by the friction connection attained by means of the interconnected load-distributing prefabricated concrete part overlapping the vertical joint. Thus, apart from applying the vertical pre-stress, no additional steps are needed to join the prefabricated concrete parts or concrete segments, which furthermore contributes to an easy and economical assembly. Moreover, the tower is executed in a way that is easy to disassemble. However, it is also conceivable—in addition to the friction connection—to provide one or more screw connections, which would preferably be executed merely as tension fasteners, however. In this case, the screw connection is introduced without pre-stress and serves only to absorb the tensile stresses that may occur.

According to an initial embodiment, at least the lateral contact faces of the prefabricated concrete parts are executed flat, i.e. they form a smooth, level surface without elevations, depressions, interconnections or the like. Then, to form the vertical joints, the contact faces abut obtusely in each case. As a result of this, the manufacture of the prefabricated concrete parts and their formwork are facilitated. For this reason, the upper and lower contact faces can also be executed flat. However, it is also possible to design the upper and/or lower contact faces with a positioning aid, a shear serration or the like.

However, according to another embodiment, the lateral contact faces of the prefabricated concrete parts can also have at least one, preferably in each case two, raised contact areas. The contact areas make it easier to bring adjacent prefabricated concrete parts of a concrete segment together all the way to the stop, which in turn can ensure the tower's stiffness in horizontal direction or an improved load-bearing capacity under bending stress. At the same time, the contact areas also facilitate the positioning of the individual prefabricated concrete parts during the assembly.

In addition, it is advantageous if the prefabricated concrete parts have an extra reinforcement or higher reinforcement content, at least on their upper and preferably also on their lower end, especially in a central area, with regard to the width of the prefabricated concrete parts. The extra reinforcement or higher reinforcement content absorbs the tension peaks, which occur when the upper area of the prefabricated concrete parts are under stress, in each case underneath the vertical joints of the concrete segment lying above.

According to a further development of the invention, at least the upper and lower contact faces of the prefabricated concrete parts are ground. As a result of this, very precisely shaped prefabricated concrete parts can be manufactured that no longer require any kind of alignment and leveling work on the construction site. Even with the lateral contact faces it can be useful to grind them in order to facilitate a precise alignment of the prefabricated concrete parts during the assembly and minimize the vertical joints. Insofar as raised contact areas are provided for the lateral contact faces, it is useful to grind them in order to attain an exact alignment of the prefabricated concrete parts to one another. In this case, the lateral contact faces themselves must not be ground.

To facilitate the handling of the prefabricated concrete parts or concrete segments and the tower assembly on the construction site, it is advantageous if the prefabricated concrete parts of one concrete segment are joined together in each case by horizontal clamping devices. Here, the horizontal clamping devices can be executed as annular tendons or as screw connections as well. However, it is also advantageous if the prefabricated concrete parts of one concrete segment are in each case joined together without applying a pre-stress using tension joining devices, especially screw connections. Here, the screw connections are preferably designed in such a way that they serve as assembly aids during the manufacturing of the tower and therefore, under normal operation, they do not represent a load-bearing connection, apart from extreme loads. Thus, the screw connections can be made in relatively small sizes and economically. Likewise, the screw connections can be designed in such a way that they merely serve to absorb the tensile stresses that could possibly occur.

An especially advantageous tower embodiment allows for the concrete segments to be made up of at least three, preferably four, annular segment prefabricated concrete parts executed as identical parts. In this case, the manufacture of the tower or its prefabricated concrete parts is facilitated because the prefabricated concrete parts executed as identical parts can be manufactured with the same formwork, at least one segment.

Here, it is advantageous if at least the lateral contact faces, possibly also the lateral contact areas of the lateral contact faces, preferably all contact faces of the prefabricated concrete parts, have a smooth (i.e. unprocessed) formwork and are preferably untreated. A reworking of the prefabricated concrete parts in the prefabricated parts facility or also on site is therefore not necessary, which facilitates the manufacture of the tower even more. In particular, material would not have to be removed or added in order to achieve a smooth surface and compensate for the tolerances of the prefabricated concrete parts. To this end, the prefabricated concrete parts are manufactured as high-precision parts in which the upper and lower contact faces lie exactly plane parallel to one another. Likewise, the lateral contact faces— at least the contact areas, if existing—are exactly positioned to the upper and lower contact faces. Here, "exactly plane parallel" and "exactly positioned" are understood to be an embodiment with such low tolerances with regard to the flatness and location of the contact faces that according to the plan, no tolerance compensation measures whatsoever, such as gluing the contact faces with mortar or the like, are necessary any longer. Alternatively or additionally, the contact faces and/or the lateral contact areas can also be ground flat, however.

It is furthermore especially advantageous if the height of the annular segment prefabricated concrete parts is lower than the width of the annular prefabricated concrete parts, in which case the height of the annular segment prefabricated concrete parts is preferably less than one-third, preferably less than one-fourth, of the width of the annular segment prefabricated concrete parts. Since the diameter of wind turbines—at least in the foot area—often reaches up to 10 m, it entails a great deal of work to transport prefabricated concrete parts from the prefabricated parts facility to the construction site even if they are executed as half shells. If the pre-fabricated concrete parts are now less high than wide, preferably less than 3 m high, then owing to the partitioning of the concrete segments in three or more prefabricated concrete parts, they have an easily transportable size for the road on which a width of less than 3 m is allowed. In addition, the relatively small size of the prefabricated concrete parts also allows them to be manufactured locally only after they are on the construction site, so that no expensive transports to the assembly location are needed any longer. In this case, it is especially advantageous if the height of the annular segment prefabricated concrete parts is less than 2.5 m.

It is furthermore advantageous if the vertical tendons are guided unbonded and outside a concrete cross section of the prefabricated concrete parts. Due to the unbonded guidance of the tendons, the tower can be built very quickly. In addition, because of this, both the re-stressing and replacement of the vertical tendons for maintenance purposes and the dismantling of the tower are significantly easier.

For a tower pre-stressed between a head bearing and a foot bearing with such vertical tendons guided outside the concrete cross section, it is additionally advantageous if the inner wall of the tower section has at least one adapted projection between the head bearing and the foot bearing, on which at least one of the vertical tendons abuts. As a result of this, the at least one tendon can easily be fixed in place by rubbing on the projection on the inner wall, so that unwanted transverse movements of the tendons can be prevented.

In this case, it is advantageous if the projection has a rectangular cross section to facilitate the manufacture of the tower or tower section because a projection with a rectangular cross section can easily be integrated into the formwork and the tower section can be easily demolded. In addition, damaging effects of the projection on the tendons can be minimized in the installation section. However, it is also conceivable to round off the edges or corners of the rectangular cross section that point towards the tower's interior. Additionally, other cross section forms such as trapezoid, semicircle, triangular, etc. are conceivable, although the edges are advantageously once more rounded off.

According to an especially advantageous further development, the projection is executed in circumferential fashion across the inner circumference of the tower section. Thus, there is the possibility of arranging vertical tendons on any point of the inner circumference of the tower section. In particular, in a prefabricated part embodiment of the tower section, such a prefabricated part can also be used for various towers having a different number of tendons.

However, it is likewise possible that only individual, bracket-shaped projections are distributed across the inner circumference of the tower section and arranged at the same height. This can be advantageous especially in tower sections that are pre-stressed only with few tendons distributed across the circumference. Likewise, in a prefabricated part embodiment of the tower section, it is also conceivable for the individual prefabricated parts to be provided with such an individual, bracket-shaped projection. Here, it is once again advantageous if the projections have a concave recess pointing to the tower's interior. As a result of this, the tendons are fixed particularly well in their cross section while being protected from damaging influences.

According to another advantageous further development it is provided, that the at least one tendon abuts under a deflection angle on the at least one projection. This causes an especially strong frictional force between the tendon and the projection, so that the tendon is held in an especially favorable way. With such an embodiment, it is even then also possible to abut the tendons on the projection if the tower section experiences a bending stress caused by strong winds, for example.

According to another further development, it is advantageous for the tower section to have several vertically offset projections adapted to its inner wall. Because of this, two or more of the vertical tendons can also be fixed in place along their length on the inner wall of the tower section, which is especially advantageous with very high tower sections measuring over 80 m.

It is furthermore especially advantageous if the tower section has at least one annular concrete segment to which the at least one projection is adapted. In this case, the tower section is made up of several annular concrete segments arranged on top of one another by forming horizontal joints and can therefore be erected using prefabricated parts. Even the at least one concrete segment with the projection can be prefabricated in this case.

It is furthermore advantageous if the at least one concrete segment with the projection is made up of at least two annular segment prefabricated concrete parts arranged in parallel. In this case, the at least one projection is adapted to at least one of the prefabricated concrete parts. As a result of this, tower sections with larger diameters of 4 m and more can be manufactured with prefabricated part construction and transported on the road, for example. In turn, it is especially advantageous here if every one of the annular segment prefabricated concrete parts of a concrete segment has one projection, so that the tower section as a whole has a circumferential projection.

BRIEF DESCRIPTION OF THE DRAWINGS

Additional advantages of the invention are described with the help of the embodiments depicted below, which show.

DETAILED DESCRIPTION

Figure 1:
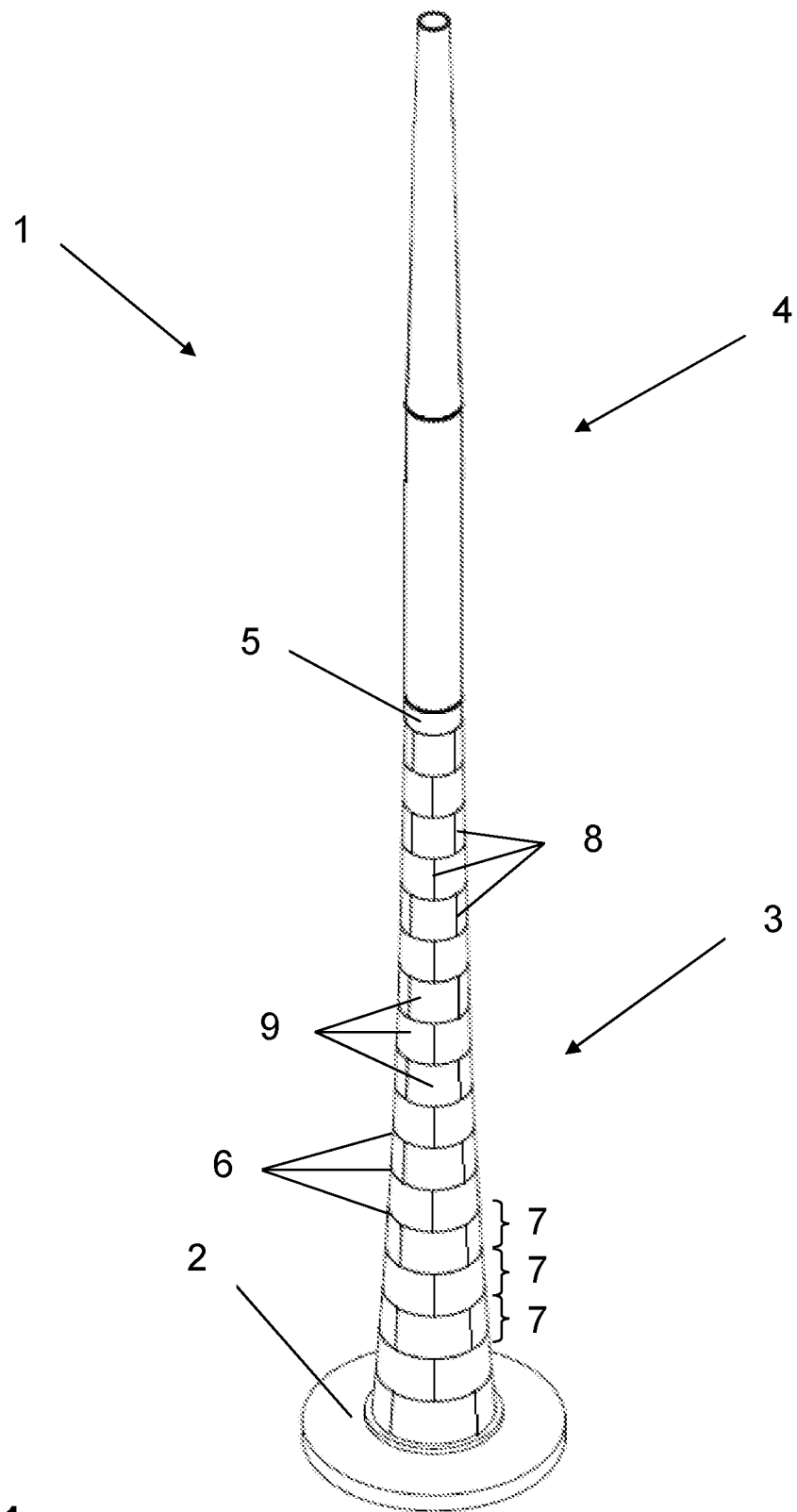
FIG. 1 is an overview of a tower of a wind turbine with a tower section of concrete.

FIG. 1 shows a tower 1 for a wind turbine with at least one tower section 3 of concrete. The tower 1 is typically erected on a foundation 2 and designed here as a hybrid tower, which means that another tower section 4 of steel is arranged and situated on the tower section 3 of concrete, whereas the two sections 3 and 4 are joined together with a transition piece 5. Deviating from the diagram shown, however, it is also possible for the tower to just have one or several tower sections 3 of concrete, in which case the tower sections 3 of concrete can also be designed differently. Here, the tower section 3 of concrete has a conical design, but it is also possible for one or several tower sections 3 of concrete to have a cylindrical design (as FIG. 4 shows) or to combine a conical tower section 3 of concrete with a cylindrical tower section 3 of concrete.

The tower section 3 of concrete shown here consists of several annular concrete segments 7 arranged on top of one another, in each case arranged on top of one another by forming horizontal joints 6. Each concrete segment 7 of the tower section 3, in turn, consists of at least 3 annular segment prefabricated concrete parts 9, which are arranged in parallel by forming vertical joints 8 in circumferential direction of the individual concrete segments 7.

Figure 4:
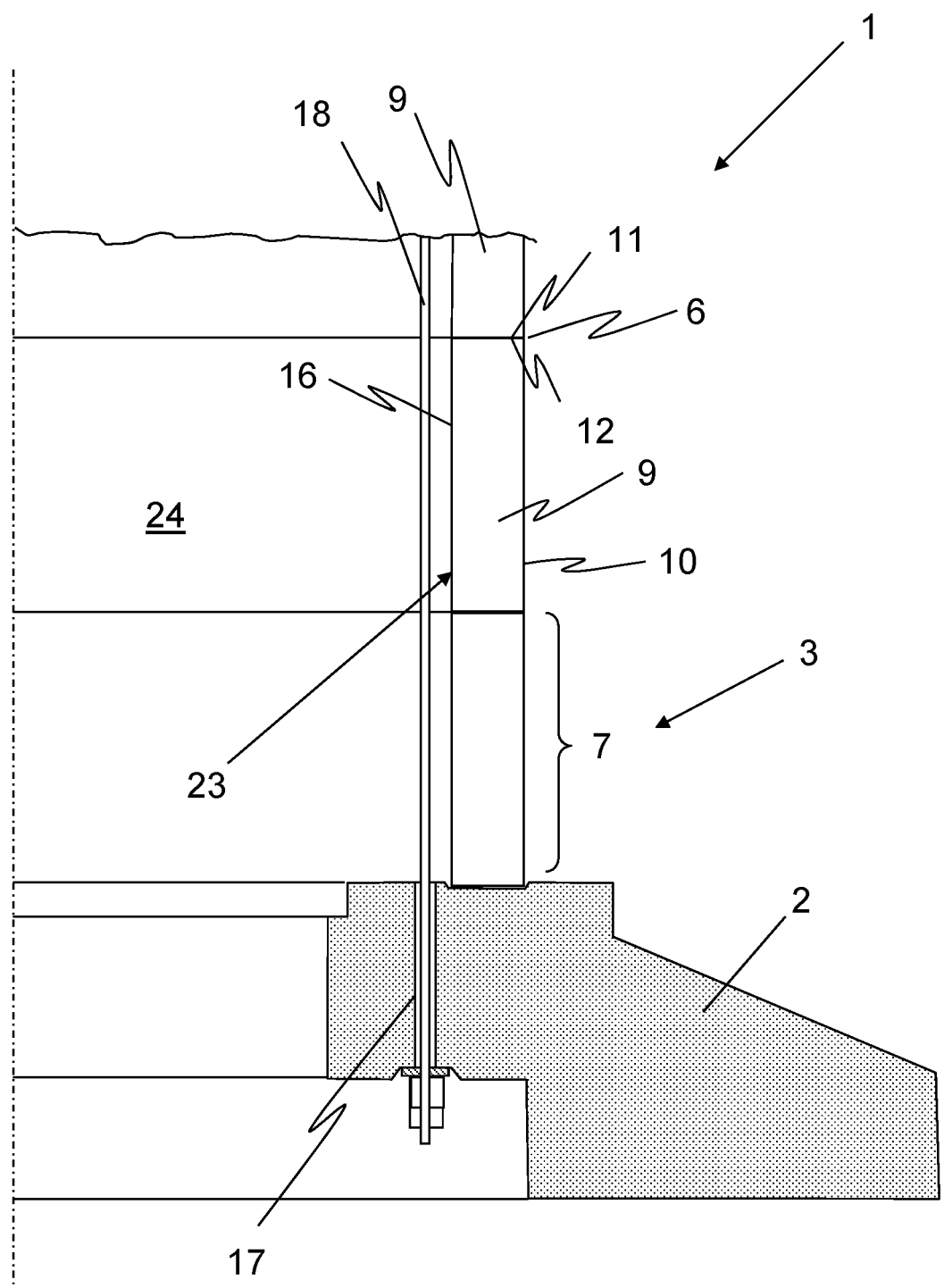
FIG. 4 is a truncated, schematic sectional diagram of a tower made up of several annular concrete segments arranged on top of one another, pre-stressed with vertical tendons.

The concrete segments 7 of the at least one tower section 3 of concrete are joined together by vertical clamping devices, particularly vertical tendons 18, as FIG. 4 especially shows. Finally, on the other end of the tower 1, a gondola and rotor of the wind turbine can still be typically arranged (not shown here). In addition to the tower section 3 shown here, in which the individual concrete segments 7 consist of several prefabricated concrete parts 9, additional tower sections 3 can be present, in which the concrete segments 7 are executed as full rings. This is especially advantageous with conical towers 1, in which the upper concrete segments 7 have a smaller diameter.

Figure 2:
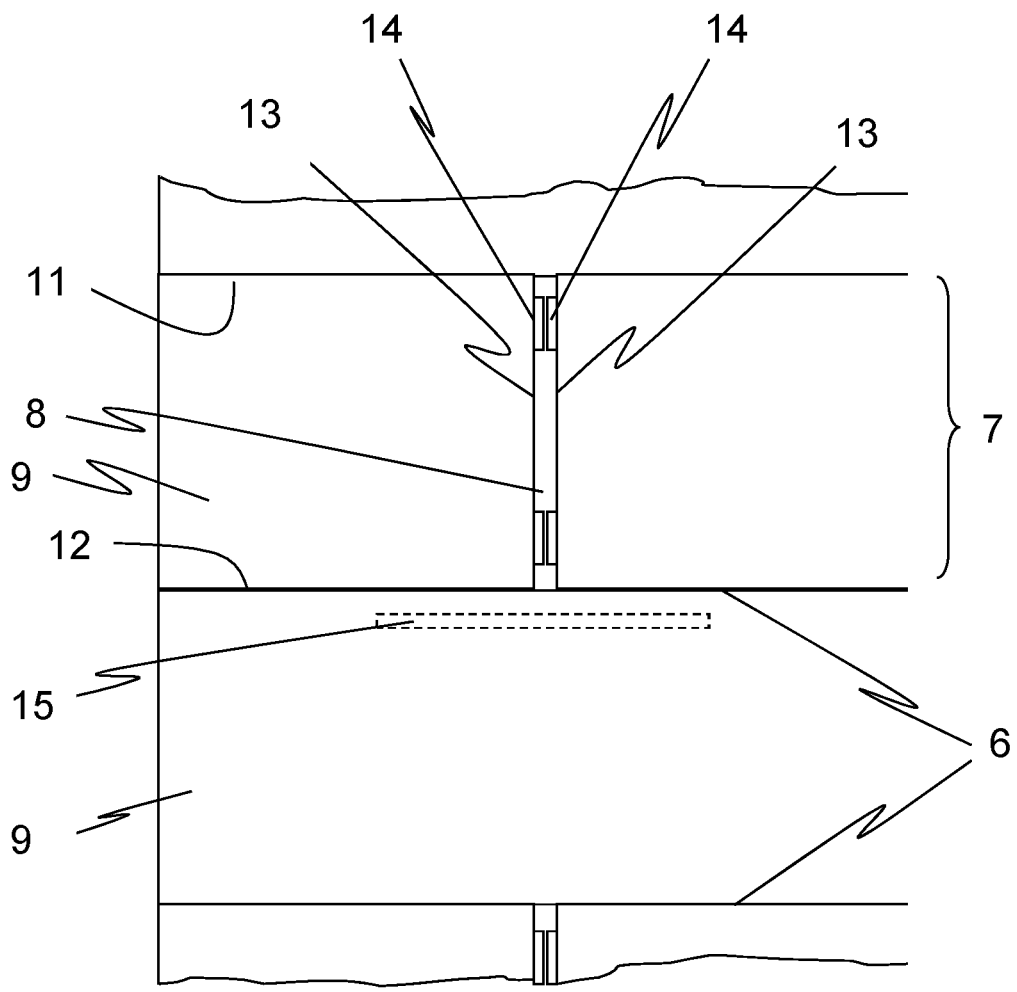
FIG. 2 is a schematic diagram of a tower section with horizontal joints and vertical joints.
Figure 3:
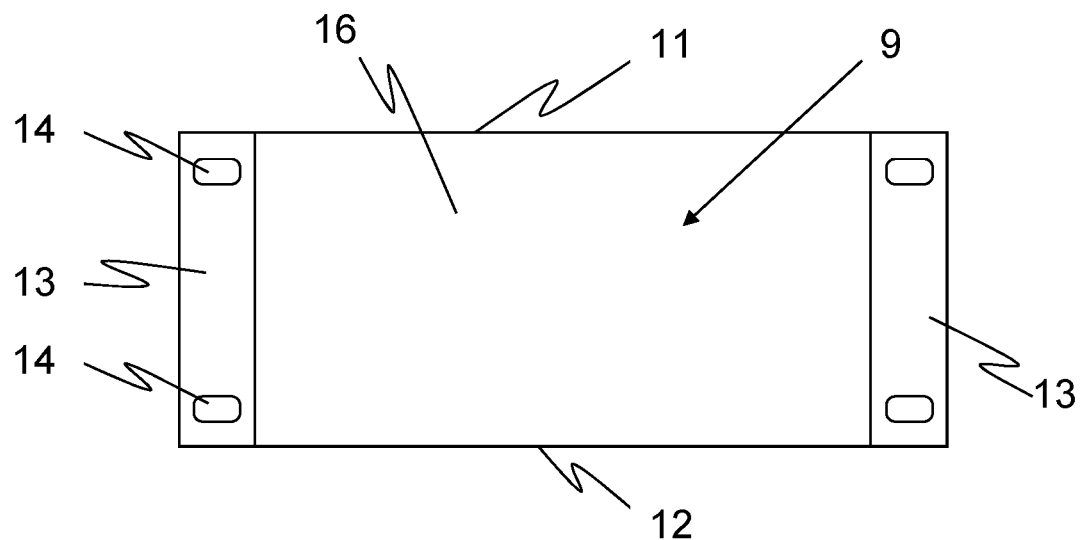
FIG. 3 is an inner side view of an annular segment prefabricated concrete part.

FIG. 2 shows a schematic, truncated detailed representation of a tower section 3 with horizontal joints 6 and vertical joints 8. It can be seen in it that each concrete segment 7 of the tower section 3 consists of at least two prefabricated concrete parts 9, made up by forming a vertical joint 8. It can furthermore be seen that each prefabricated concrete part 9 has one upper contact face 11, one lower contact face 12 and two lateral contact faces 13. Here, the lateral contact faces 13 have been provided with raised contact areas 14 that abut against one another in horizontal direction of the tower 1 or concrete segment 7. FIG. 3 shows such an individual annular segment prefabricated concrete part 9 seen from the inner side 16.

For reasons of better clarity, FIG. 2 shows these contact areas 14 slightly separated from one another and also strongly protruding. In fact, however, in the fully assembled tower 1, the contact areas 14 are mounted all the way to the stop and protrude only slightly from the lateral contact faces 13. Furthermore, the horizontal joints 6 (shown fully closed here) can be recognized, which also corresponds to the condition after the vertical pre-stress was applied.

As can now be seen in the schematic longitudinal section of FIG. 4, the tower section 3 of concrete is pre-stressed in vertical direction by vertical tendons 18, which join together the individual concrete segments 7 arranged on top of one another. Here, the vertical tendons 18 are unbonded and guided into the interior 24 of the tower outside of the concrete cross section of the prefabricated concrete parts 9 and therefore easily built in. The concrete segments 7 are joined here together in vertical direction of the tower 1 only by the vertical tendons 18. In this case, the vertical tendons 18 are fixed to a foot bearing, preferably the foundation 2, of the tower 1 and extend at least all the way to the end of the corresponding tower section 3 of concrete, where they are preferably fixed to a head bearing, which can be the transition piece 5 (see FIG. 8). Here, the vertical tendons 18 are guided into the foundation 2 through cladding tubes 17.

So the horizontal joints 6 can be executed as narrowly as possible and can still be fully closed, the upper and lower contact faces 11, 12 of the prefabricated concrete parts can be ground. Therefore, the contact faces 11, 12 have such low tolerances both with regard to their flatness and to their parallelism to one another that at least the horizontal joints 6 are almost fully closed at least after the pre-stress is applied by the vertical tendons 18. The lateral contact faces 13, or rather their contact areas 14 (see FIGS. 2 and 3), can therefore be ground so the vertical joints can be executed as narrowly as possible too. The grinding of the contact faces furthermore facilitates the assembly of the tower section, since owing to the high precision with regard to the position of the contact faces 11, 12, 13 no more alignment work needs to be done. However, instead of grinding the contact faces 11, 12, 13 it is likewise possible to manufacture the prefabricated concrete parts already as high-precision parts, as explained with the help of FIGS. 5-7.

Now, as FIG. 2 also shows, the prefabricated concrete parts 9 of one concrete segment 7 are joined in horizontal direction by a friction, load-bearing connection through the pre-stress force of the vertical tendons 18 and that of the prefabricated concrete parts 9 of the concrete segment 7 lying above that overlap the vertical joints 8. Therefore, to assemble the tower section 3, the prefabricated concrete parts 9 are loosely placed on those of the concrete segment 7 lying underneath and placed all the way to the stop with regard to their lateral contact faces 13, so that the vertical joints 8 are largely closed. Afterwards, the prefabricated concrete parts 9 of the concrete segment 7 lying above are put down in such a way that the vertical joints 8 are offset from the concrete segment 7 lying underneath and the prefabricated concrete parts 9 of each upper concrete segment 7 overlap the vertical joints 8 of each concrete segment 7 lying below. If the concrete segments 7 are made up of two prefabricated concrete parts 9, then the prefabricated concrete parts 9 of the concrete segments 7 lying on top of one another are preferably offset in each case by 90° to each another. However, other offset angles, for example of only 45°, are possible as well. Subsequently, the vertical tendons 18 are put in place and tensioned. In this case, the vertical tendons 18 are pre-stressed with such a high pre-stressing force that they prevent the resulting friction force occurring in the horizontal joints 6 from moving the prefabricated concrete parts 9 apart in horizontal direction, thereby preventing an opening of the vertical joints 8.

In this case, due to the lateral contact faces 13 or their contact areas 14 butting against one another, the tower 1 is provided with good horizontal stiffness and better load-bearing capacity under bending stress. If the contact faces 13 are provided with the raised contact areas 14, then the positioning of the individual prefabricated concrete parts 9 will also be facilitated during the assembly. Preferably, the prefabricated concrete parts 9 have at least one contact area 14 on each lateral contact face 13 with which in mounted state they make contact with a lateral contact area 14 of an adjacent prefabricated concrete part 9. As far as two contact areas 14 are provided on one lateral contact face 13 of a prefabricated concrete part 9, it is also sufficient if in the vertical joint only one of the contact areas 14 makes contact with a contact area 14 of an adjacent prefabricated concrete part 9.

Figure 5:
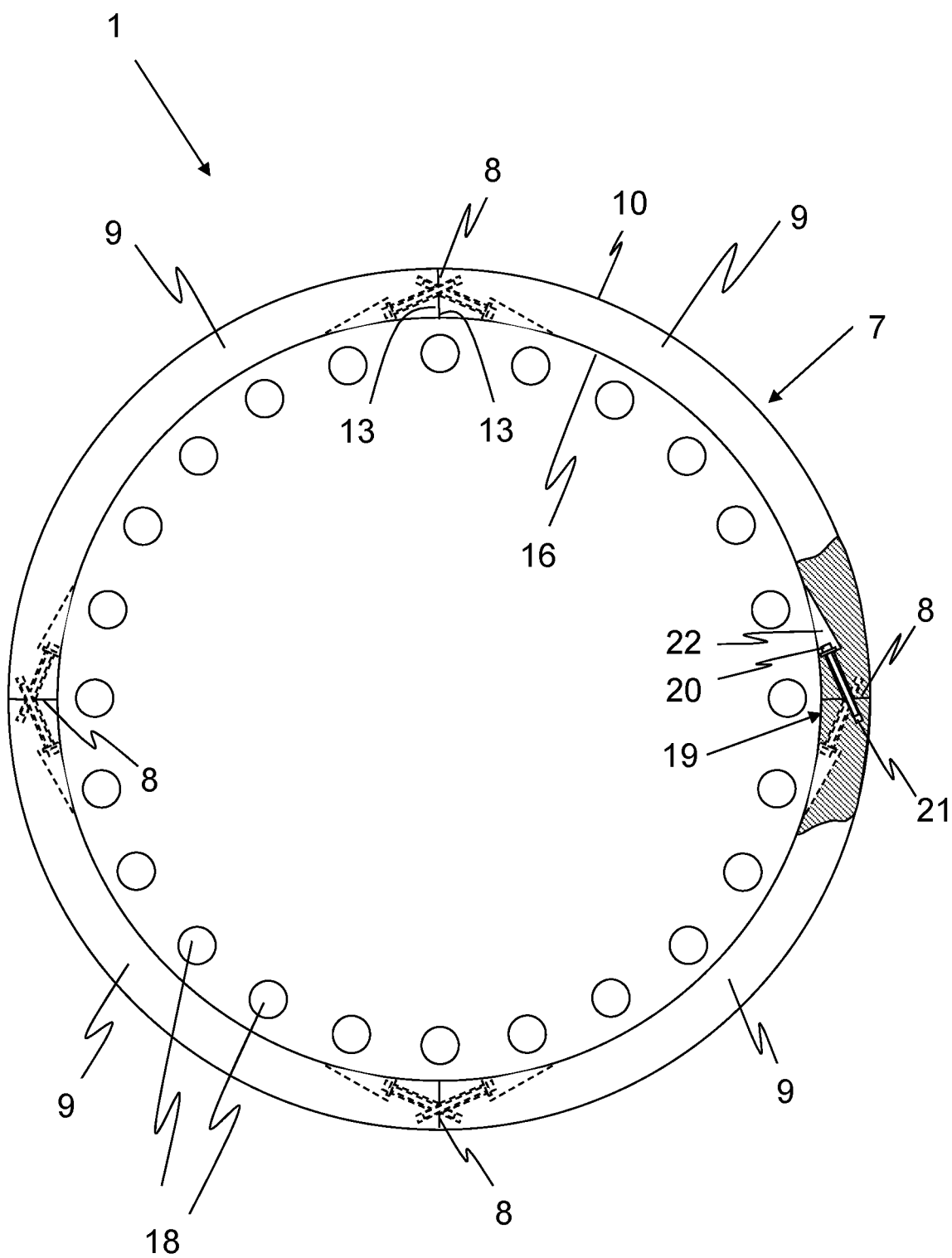
FIG. 5 is a top view of a tower section with a concrete segment made up of four annular segment prefabricated concrete parts.

However, the contact faces 13 can likewise be executed as smooth, flat surfaces without contact areas 14, as FIG. 5 shows. Since the holding together of the individual prefabricated concrete parts 9 of a concrete segment 7 is significantly or even exclusively brought about by the friction forces in the horizontal joints 6, the contact areas 14 are not absolutely necessary. For the same reason, it does not affect the stiffness of the tower 1 if the vertical joints 8 open up somewhat under stress or one vertical joint 8 possibly also remains fully open due to the assembly tolerances. In any case, owing to the load-bearing connection made possible by the pre-stressing force of the vertical tendons 18, neither a casting nor a screwing of the vertical joints 8 is necessary.

Because the individual prefabricated concrete parts 9 of a concrete segment 7 are not joined to one another, if a loading case occurs, it can cause significant stress peaks in the area of the prefabricated concrete parts 9 of the concrete segment 7 that lies underneath a vertical joint 8. According to the diagram of FIG. 2, the prefabricated concrete parts 9 have therefore been provided with extra reinforcement 15 or a higher reinforcement content in their upper end, in the area lying under the vertical joint 8, which depending on offset angle, lies usually in the center of the prefabricated concrete part 9.

So a tower section 3 of a wind turbine can be manufactured in an especially easy way and mounted on the construction site, according to the embodiment shown in FIG. 5, it is provided for the annular segment prefabricated concrete parts 9 to be executed as exact identical parts. As a result of this, easy manufacturing of the prefabricated concrete parts 9 with the fewest possible formworks can be achieved. It is advantageous here for the individual concrete segments 7 not to be made up of two, but of three or more prefabricated concrete parts 9. Because of this, the individual prefabricated concrete parts 9 are smaller and can therefore be more easily transported to the construction site or manufactured locally on the construction site with transportable formworks.

In order to facilitate the handling of the prefabricated concrete parts 9 on the construction site and their positioning on each concrete segment 7 lying underneath, according to this diagram the individual prefabricated concrete parts 9 are put together using horizontal screw connections 19 to create one concrete segment 7. To achieve this, according to this diagram, two screws 20 are necessary for each vertical joint 8, vertically offset and introduced to the connection point from inside at an angle. Here, the screw connection points are easily accessible from the inner side 16 through recesses 22, so that the screw connections 19 can be easily made or easily removed again if necessary. In this case, the screw connection 19 contains one dowel 21 molded in the area of a lateral contact face 13 of a prefabricated concrete part 9, and a screw 20 introduced through the recess 22 of an adjacent prefabricated concrete part 9 into the dowel 21.

Here, the screw connections 19 are provided as mounting aids, without serving to transfer the force under normal operation. Only in an extreme case when there are strong wind stresses, for example, they will serve to transfer the force. By means of the screw connections 19, it is possible to fix several prefabricated concrete parts 9 of a concrete segment 7 together and handle them as one structural part. The concrete segment 7 can thus be assembled quicker and easier at the mounting location with the screw connections 19 and placed on the already existing tower section 3. In this case, the screw connections 19 are designed in such a way that they bear the own weight of the structural part formed in such a way. The prefabricated concrete parts 9 are thereby joined together even before the vertical tendons 18 are tensioned and already secured as a result of that while the tower section 3 is being assembled. After the tower is completed, the screw connections 19 can be left in the prefabricated concrete part to eliminate the removal working step or to ensure the tower's own stability in case of maintenance, when the vertical tendons 18 are exchanged or during a dismantling, for example.

Figure 6:
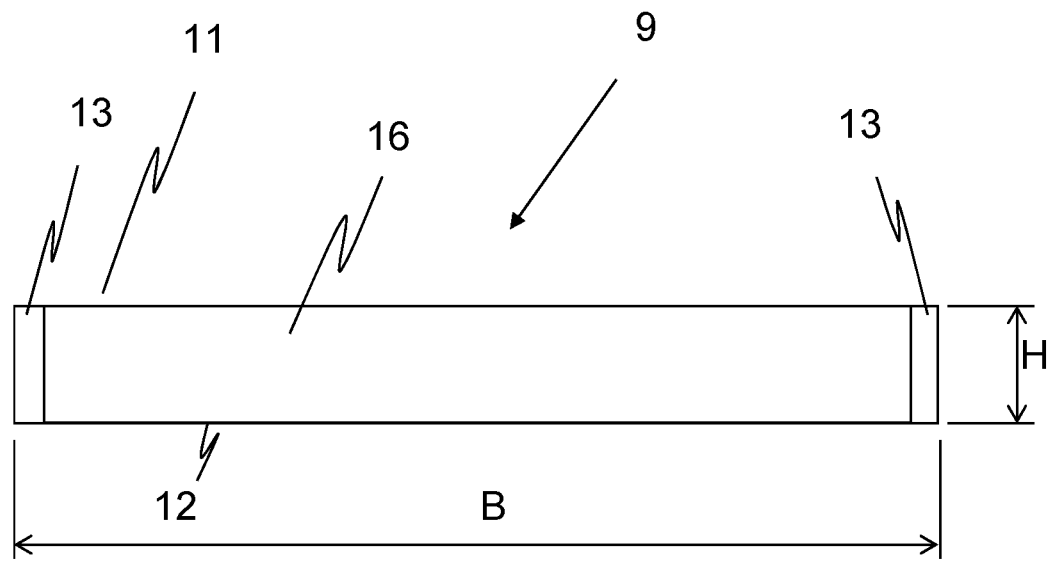
FIG. 6 is a frontal view from the inside of another embodiment of an annular segment prefabricated concrete part.
Figure 7:
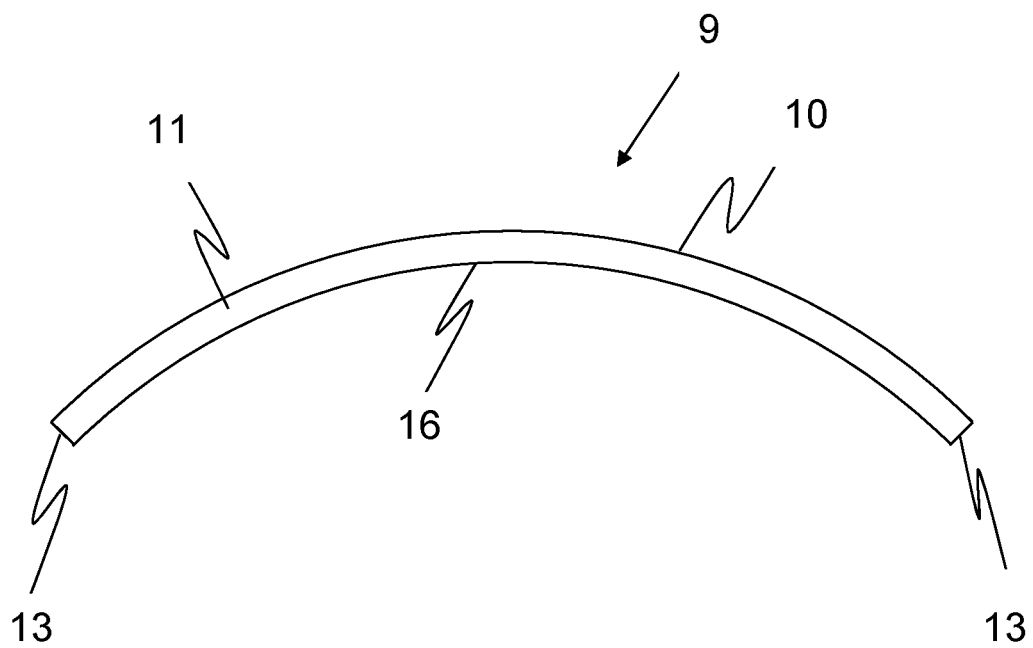
FIG. 7 is a top view of the annular segment prefabricated concrete part of FIG. 6.

FIG. 6 shows a frontal view for a prefabricated concrete part 9 suitable for such a tower section 3 seen from the inner side 16 and FIG. 7 shows a top view. Here, the prefabricated concrete part 9 has one outer side 10, one inner side 16, one upper contact face 11, one lower contact face 12 and two lateral contact faces 13. Like the prefabricated concrete part of FIG. 3, these prefabricated concrete parts 9 can also have contact areas 14. However, the contact faces 13 can also be executed as completely flat surfaces. The height H of the annular segment prefabricated concrete parts 9 is here considerably smaller than their width B. Preferably, the height H of the prefabricated concrete parts is less than 3 m. Therefore, the prefabricated concrete parts 9 can be transported lying flat, without exceeding the maximum permissible road transportation width. It is therefore especially advantageous for the prefabricated concrete parts 9 to be less than 2.50 m high because they can then be transported with conventional transportation vehicles. The height of the prefabricated concrete parts 9 is here oriented in transverse direction of the transportation vehicle. In this case, it is especially advantageous that owing to their shell-like design, the prefabricated concrete parts 9 can be stacked, therefore allowing also several superimposed prefabricated concrete parts 9 to be transported lying flat.

The prefabricated concrete parts 9 are in this case manufactured with a formwork (not depicted) as high-precision parts. This means that the prefabricated concrete parts 9 reach their ready-to-install final contour already through the casting, without needing another processing step. The prefabricated concrete parts 9 are cast here with such a high degree of precision that the upper contact face 11 and lower contact face 12 are oriented exactly plane-parallel to one another without post-processing. Likewise, the two lateral contact faces 13 are oriented to one another at an exact right angle towards the upper and lower contact faces 11, 12. The angle between the two lateral contact faces 13 of each prefabricated concrete part 9 is 120° with three prefabricated concrete parts 9 per concrete segment 7, and 90° with four prefabricated concrete parts 9 per concrete segment 7.

To do this, the formwork (not shown) to manufacture the prefabricated concrete parts contains in each case two frontal formworks and two lateral formworks, each adjustable independently of one another with regard to the basic formwork. Subsequent work to achieve plane-parallelism in each one of the two contact faces 11, 12 lying opposite one another is therefore unnecessary. Likewise, the orientation of the lateral contact faces 13 to the upper and lower contact faces 11, 12 is in each case developed precisely in such a way that when several prefabricated concrete parts 9 are assembled to create an annular concrete segment 7, no compensation mass must be introduced into the vertical joints.

Due to the small dimensions of the prefabricated concrete parts 9 and therefore of the associated formworks as well, the prefabricated concrete parts 9 can be manufactured directly at the assembly location or at least close to it, so that no difficult and expensive transporters, which often require the construction of new access roads and the whacking of approach paths, are necessary. Once the tower 1 or planned towers 1 have been fully erected on the assembly site, the formworks can be simply be transported further to the next assembly site and serve there once again for the on-site manufacture of prefabricated concrete parts 9. Thus, in spite of the on-site production, an economical manufacture of the prefabricated concrete parts 9 or towers 1 is made possible.

Figure 8:
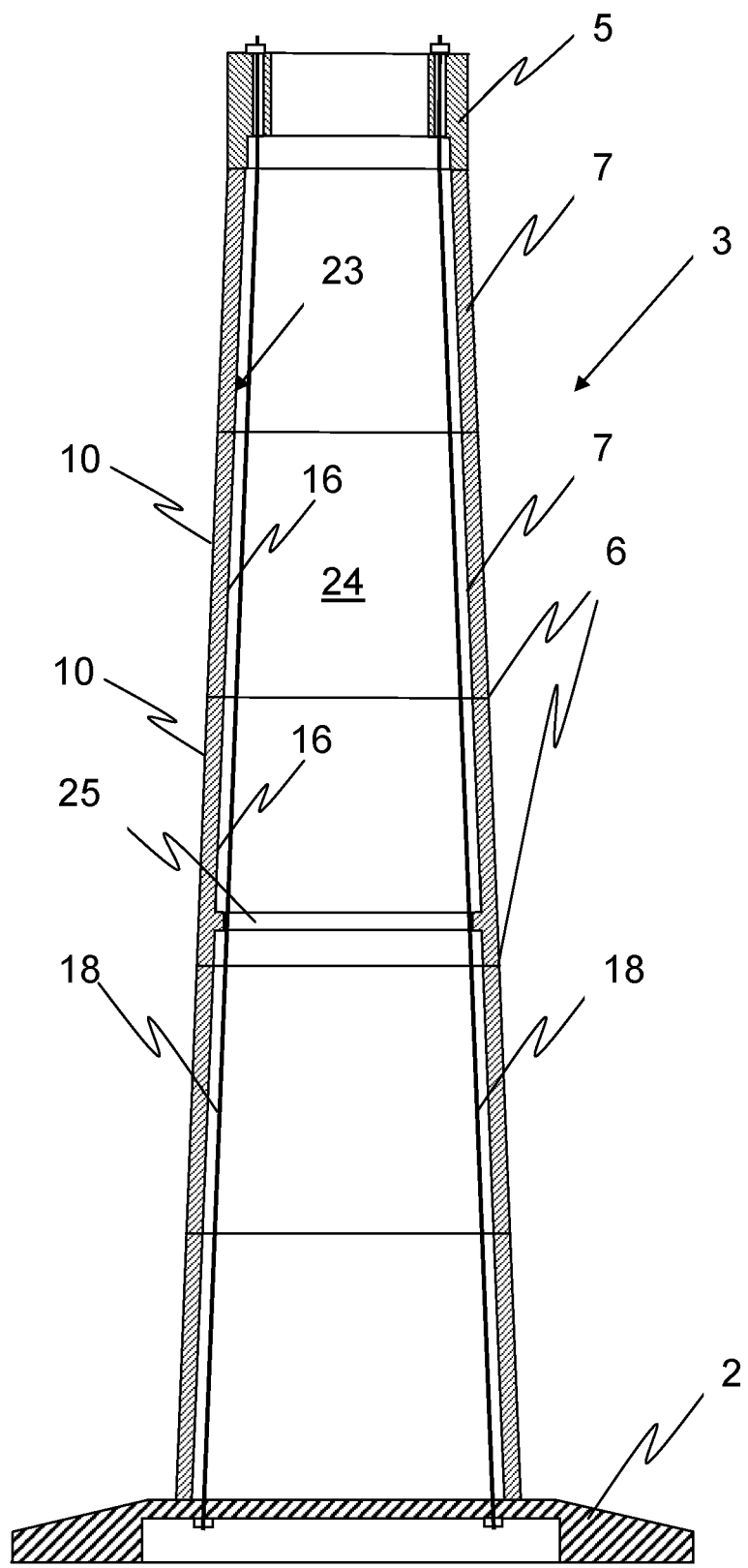
FIG. 8 is a sectional view of a tower pre-stressed with vertical tendons, made up of several annular concrete segments arranged on top of one another according to a second embodiment.

The schematic cross section diagram of FIG. 8 shows another embodiment of the tower 1. Like the tower section 3 shown in FIG. 4, the tower section 3 shown here is made up of several annular concrete segments 7 arranged on top of one another. The concrete segments 7 arranged on top of one another are, in turn, held together by means of vertical tendons 18, which extend between a head bearing—here once again a transition piece 5—and a foot bearing, here once again the foundation 2. Here, the vertical tendons 18 are at least fixed to one of their two ends, but preferably on both of their ends, with a pre-stressing anchor and can thus be restressed. The vertical tendons 18 also run outside of the concrete cross section of the concrete segments 7 into the interior 24, which is enclosed by the inner wall 23 of the tower section 3. Here, the inner wall 23 consists, in turn, of the individual inner sides 16 of the individual concrete segments 7 or of the individual prefabricated concrete parts 9 of the concrete segments 7 (see FIGS. 10-12). In this case, the individual concrete segments 7 can be executed as one annular piece or, as already described in FIGS. 2-7, made up of several annular segment prefabricated concrete parts 9.

Here, only the tower section 3 of the tower 1 is shown. Naturally, another tower section 3, 4 of concrete or steel can also be arranged on this tower section 3, which together with the tower section 3 shown here, then forms the tower 1 for the wind turbine. In this case, the vertical joints 6 between the individual concrete segments 7 are recognizable as well. For reasons of clarity, only the outer side 10 and the inner side 16 of the individual concrete segments 7 are named in this diagram. Needless to say, however, they also have one upper contact face 11, one lower contact face 12, and—as far as the concrete segments 7 are built of prefabricated concrete parts 9—lateral contact faces 13, as they were described in the previous figures. The same applies to the following FIGS. 9-12, on which due to reasons of clarity, only the structural parts or characteristics described were labeled.

As can now be seen in FIG. 8, according to this diagram, the concrete segment 7 has on its inner side 16 a projection 25, on which the vertical tendons 18 abut. Thus, the vertical joints 18 can be fixed with friction forces to the inner wall 23 or to the projection 25, so the free oscillating length of the vertical tendons 18 can be reduced and unwanted transversal movements prevented. It is therefore possible to also execute very high towers 1 without an additional, active intermediate fastening of the tendons 18. In this case, the relevant concrete segment 7 or the prefabricated concrete part 9 can be very easily manufactured with the projection 25, as the projection 25 can be well integrated into the formwork. In addition, this also facilitates the assembly on the construction site because the vertical tendons 18 do not need any additional assembly steps for this intermediate fastening. Moreover, it is sufficient to fix the vertical tendons 18 in place on their head bearing, for example, unroll them downwards, and anchor them on their foot bearing. Here, the vertical tendons 18 are automatically guided above the projection 25 and fixed to it by friction after tensioning, in which a pressing force is created on the vertical tendons 18. Especially advantageous here is that such fixation of the vertical tendons 18 on a projection 25 can be used with different construction designs of tower sections 3 or towers 1. Thus, the adapted projection 25 cannot only be used in connection with annular one-piece concrete segments 7, but also with concrete segments 7 made up of several prefabricated concrete parts 9. In addition, it is also possible to provide such a projection 25 on an in-situ concrete tower.

Here, only two vertical tendons 18 are shown as examples. It goes without saying that in a real tower section 3 at least three, generally many vertical tendons 18 are distributed across the inner circumference of the tower section 3. In this case, the vertical tendons 18 can be distributed equidistantly across the inner circumference or individual groups of vertical tendons 18 can be formed to be also equidistantly distributed across the inner circumference, whereas gaps between such individual groups occur. However, executions in which one vertical tendon 18 extends beside the next one so that the entire inner circumference of the tower section 3 is covered with vertical tendons 18 are also possible.

According to the diagram shown here, the projection 25 is executed so it can extend circumferentially across the entire inner circumference of the tower section 3 or of the concrete segment 7. It can thus be used in any towers 1 with any number and arrangement of vertical tendons 18.

This diagram also shows a tower section 3 in which only one projection 25 is provided on the inner wall 23. Needless to say, however, it is also possible to arrange another projection 25 vertically offset to the first projection 25 of the inner wall 23 in order to attain a better fixation of the vertical tendons 18 in very high towers 1 as a result of this. Furthermore, it goes without saying that this diagram showing only five concrete segments 7 should merely be understood as an example and that real tower sections 3 are built from considerably more concrete segments 7 or prefabricated concrete parts 9.

Figure 9:
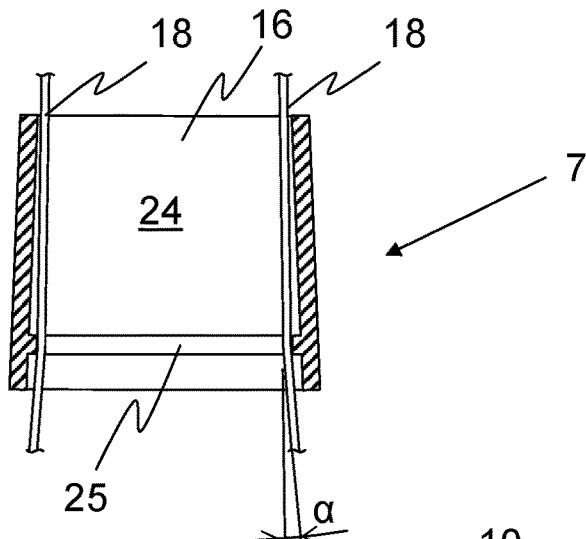
FIG. 9 is a schematic sectional view of an annular concrete segment with a projection.

FIG. 9 shows a cross section of a one-piece, annular concrete segment 7, which likewise has one projection 25 on its inner side 16. Contrary to the diagram of FIG. 8, the vertical tendons 18 are guided here under a deflection angle α across the at least one projection 25. The abutment under a deflection angle α makes it possible to exert extremely high pressing forces on the tendons 18, so that they are especially well fixed in place by high friction forces. Naturally, such a guidance of the vertical tendons 18 under a deflection angle α is also possible in combination with segment prefabricated concrete parts 9 or an in-situ concrete tower.

Figure 10:
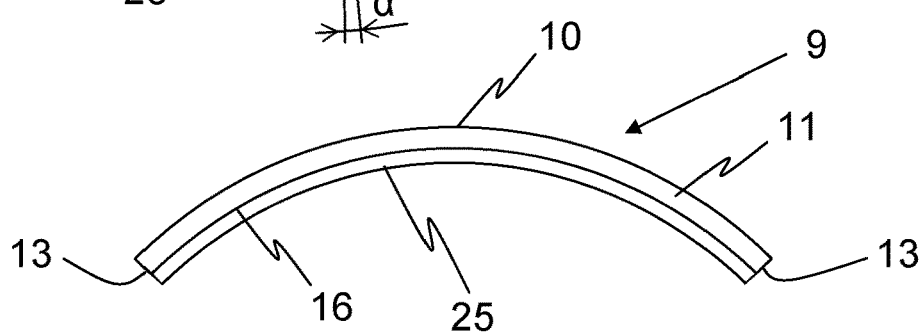
FIG. 10 is a top view of an annular segment prefabricated concrete part with a projection.

FIG. 10 shows an annular segment prefabricated concrete part 9, which together with additional annular segment prefabricated concrete parts 9, can be assembled to have one annular concrete segment 7. The annular segment prefabricated concrete part 9 also has (like the one shown in FIG. 7) one outer side 10, one inner side 16, two lateral contact faces 13 and an upper contact face 11. A lower contact face 12 (see FIGS. 2-4) is not visible in this diagram. The annular segment prefabricated concrete part 9, in turn, has on its inner side 16 a projection 25 that is preferably bracket- or flange-shaped (like the one shown in FIGS. 8 and 9) and preferably has a rectangular cross section. In this case, the edges of the rectangular cross section pointing towards the interior 24 are preferably rounded off to prevent the damaging effects of the projection 25 to the vertical tendons 18.

Preferably, several of these annular segment prefabricated concrete parts 9 (according to this diagram, four such prefabricated concrete parts 9) are assembled to form one concrete segment 7, so that once again the result is one circumferential flange-like projection 25. However, it is also conceivable—especially if there are more than four annular segment prefabricated concrete parts 9 per concrete segment 7—that merely one part of the annular segment prefabricated concrete parts 9 has such a projection. During the assembly of the tower section 3, these prefabricated concrete parts 9 are then arranged in such a way that the projections 25 run where the vertical tendons 18 should later be pulled in.

Figure 11:
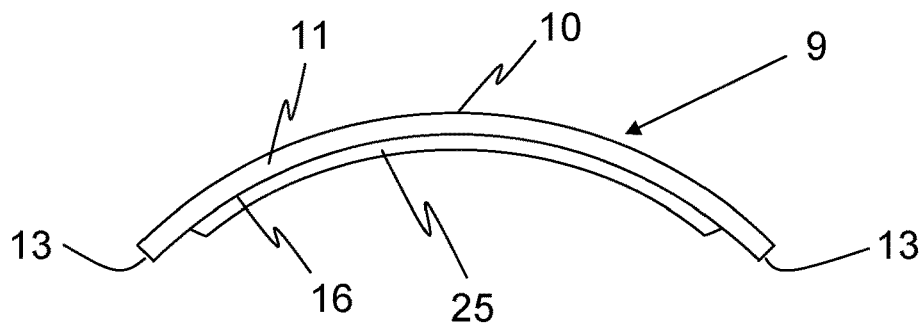
FIG. 11 is a top view of another embodiment of an annular segment prefabricated concrete part with a projection.

FIG. 11 shows another embodiment of a prefabricated concrete part 9, in which a projection 25 executed in the shape of a bracket does not extend across the entire inner side 16. Such an embodiment can be suitable for demolding, for example, and contributes to the possibility that the lateral contact faces 13 can be flatly designed or processed (e.g. ground) in an especially easy way. Even here, it is conceivable once again to join several vertical tendons 18 together to groups, whereas the group of tendons 18 then extends into the area of the projection 25, whereas no vertical tendons 18 are arranged in the inner side 16 area outside the projections 25.

Figure 12:
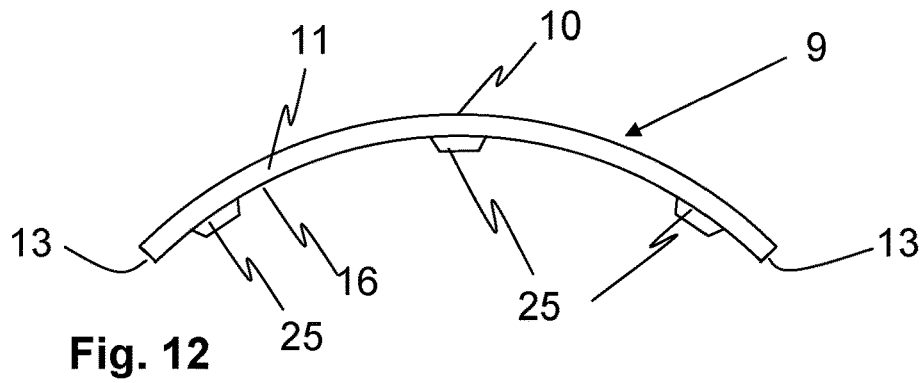
FIG. 12 is a top view of another embodiment of an annular segment prefabricated concrete part with several projections.

FIG. 12 shows another embodiment of an annular segment prefabricated concrete part 9, in which several projections 25 are distributed at the same height, but across the inner circumference of the prefabricated concrete part 9, on the inner side 16. The projections 25 are, in turn, provided in the areas of the tower section 3, in which the subsequent arrangement of vertical tendons 18 is planned. Naturally, it would also be conceivable to provide one annular concrete segment 7 with such projections 25 distributed across the inner circumference.

Figure 13:
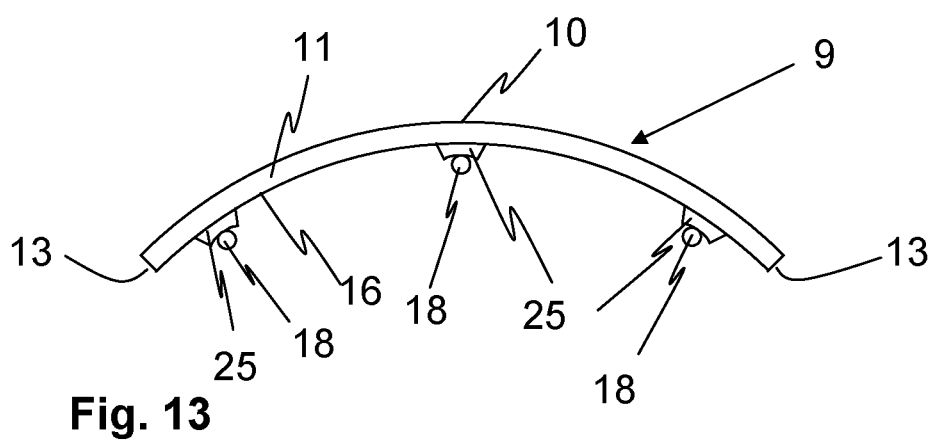
FIG. 13 is a top view of another embodiment of an annular segment prefabricated concrete part with several projections.

FIG. 13 shows another embodiment of an annular segment prefabricated concrete part 9 with several projections 25 across the inner circumference of the prefabricated concrete part 9 distributed on the inner side 16. However, on their side pointing to the tower's interior 24, the projections 25 are not flatly executed as those of FIG. 12, but have a concave recess pointing to the interior 24. Here, the tendons 18 lie on the deepest point of the concave recess and, as a result of this, are especially well fixed in their transversal direction or are automatically placed back after a possible displacement. Such a design is advantageous, especially with wire tendons.

To sum up, the manufacturing of the present tower 1 with concrete segments 7 made up of several prefabricated concrete parts 9 is facilitated because the individual prefabricated concrete parts 9 can be easily positioned and no time-consuming connections of the vertical joints 8 or of the prefabricated concrete parts 9 of a concrete segment 7 are necessary. The casting-free assembly of the prefabricated concrete parts 9 to concrete segments 7 and of the concrete segments 7 to a tower section 3 of concrete can here be made easier by the highly precise production of the prefabricated concrete parts 9 as identical parts. Owing to the casting-free execution of the horizontal joints and vertical joints as well as the composite-free guidance of the vertical tendons, the tower's assembly, maintenance and dismantling are facilitated. In this case, the fixation of the vertical tendons 18 to the projection 25 contributes to the easy manufacturing of the concrete segments 7 or the prefabricated concrete parts 9 and to the easy assembly of the tower sections 3.

REFERENCE LIST

1 Tower
2 Foundation
3 Tower section of concrete
4 Tower section of steel
5 Transition piece
6 Horizontal joint
7 Concrete segment
8 Vertical joint
9 Prefabricated concrete part
10 Outer side
11 Upper contact face
12 Lower contact face
13 Lateral contact face
14 Contact area
15 Extra reinforcement
16 Inner side
17 Cladding tube
18 Vertical tendon
19 Screw connection
20 Screw
21 Dowel
22 Recess for screw connection
23 Inner wall
24 Interior
25 Projection
H Height
B Width
$\alpha$ Deflection angle

We claim:

1. A tower for a wind turbine comprising:
at least one tower section of concrete with an inner wall which is pre-stressed with vertical tendons between a head bearing and a foot bearing, the tower section having an inner wall defining an interior of the tower section, the vertical tendons located completely radially inward of the cross-section in the interior and adjacent the inner wall, wherein the inner wall between the head bearing and the foot bearing has at least one adapted projection formed unitary with the tower section and on which at least one of the vertical tendons abuts an outermost surface of the projection.

2. The tower according to claim 1, wherein the projection has a rectangular cross section.

3. The tower according to claim 1, wherein the projection is configured circumferentially across an inner circumference of the tower section.

4. The tower according to claim 3, wherein several of the projections are arranged across the inner circumference of the tower section distributed at the same height.

5. The tower according to claim 1, wherein the at least one vertical tendon abuts on the at least one projection at a deflection angle ($\alpha$).

6. The tower according to claim 1, wherein the tower section has several projections adapted vertically offset to the inner wall of the tower.

7. The tower according to claim 1, wherein the tower section has at least one annular concrete segment to which the at least one projection is adapted.

8. The tower according to claim 7, wherein the annular concrete segment is made up of at least two prefabricated concrete parts arranged in parallel, wherein the at least one projection is adapted to at least one of the prefabricated concrete parts.

9. A tower for a wind turbine comprising:
at least one tower section having a plurality of annular concrete segments that define a central axis that is vertical, each annular concrete segment including at least two prefabricated concrete parts, each prefabricated concrete part having an outer side, an inner side, an upper contact face, a lower contact face, two lateral contact faces, and a center area between the two lateral contact faces, each prefabricated concrete part having a reinforcing element located only in the center area and embedded within the prefabricated concrete part, the annular concrete segments arranged in a vertical stack with a horizontal joint located between respective upper contact faces of the prefabricated concrete parts within one annular concrete segment and respective lower contact faces of the prefabricated concrete parts within an adjacent annular concrete segment, the prefabricated concrete parts within each annular concrete segment arranged with a vertical joint between the lateral contact faces of each adjacent pair of prefabricated concrete parts, each of the vertical joints within a given annular concrete segment being offset circumferentially relative to the central axis from the vertical joints within adjacent annular concrete segments so that the reinforcing element of each prefabricated concrete part in an annular concrete segment underlying another annular concrete segment underlies a vertical joint within the another annular concrete segment, the annular concrete segments being joined together in a direction along the central axis only by vertical clamping devices that create a load-bearing friction connection between the annular concrete segments.

10. The tower according to the claim 9, wherein the prefabricated concrete parts of each vertical joint of each annular concrete segment is joined together only by a friction connection extending through each prefabricated concrete part of each vertical joint.

11. The tower according to claim 10, wherein at least the lateral contact faces of the prefabricated concrete parts are configured flatly and obtusely abut against one another to form the vertical joints.

12. The tower according to claim 11, wherein the lateral contact faces of the prefabricated concrete parts each have at least one raised contact area.

13. The tower according to claim 9, wherein at least one of the upper contact face and the lower contact face is ground.

14. The tower according to claim 9, wherein the prefabricated concrete parts of one of the annular concrete segments are joined together by one of horizontal-clamping devices and tension joint screw devices.

15. The tower according to claim 9, wherein the annular concrete segments are made of at least three identical prefabricated concrete parts.

16. The tower according to claim 9, wherein the upper contact faces, the lower contact faces, and the lateral contact faces of the prefabricated concrete parts are flat.

17. The tower according to claim 9, wherein a height (H) of the prefabricated concrete parts is smaller than a width (B) of the prefabricated concrete parts.

18. The tower according to claim 17, wherein the height (H) of the prefabricated concrete parts is less than 3 m.

19. The tower according to claim 9, wherein the vertical clamping devices include vertical tendons guided unbonded and outside of the cross-section of the prefabricated concrete parts.

* * * * *